United States Patent [19]

Swanson

[11] Patent Number: 5,596,935
[45] Date of Patent: Jan. 28, 1997

[54] SYSTEM FOR AND METHOD OF SOIL REMEDIATION AND HOT MIX ASPHALT PRODUCTION

[75] Inventor: Malcolm L. Swanson, Chickamauga, Ga.

[73] Assignee: Astec Industries, Inc., Chattanooga, Tenn.

[21] Appl. No.: 552,720

[22] Filed: Nov. 3, 1995

[51] Int. Cl.⁶ ........................................................ B09B 3/00
[52] U.S. Cl. ...................... 110/235; 110/246; 110/346; 110/236; 432/106; 432/107; 432/118
[58] Field of Search ............................ 110/235, 236, 110/226, 246, 346; 432/105, 106, 107, 111, 117, 118

[56] References Cited

U.S. PATENT DOCUMENTS

| | | | |
|---|---|---|---|
| 4,309,113 | 1/1982 | Mendenhall | 366/4 |
| 4,540,287 | 9/1985 | Servas et al. | 366/7 |
| 4,827,854 | 5/1989 | Collette | 110/237 |
| 5,129,334 | 7/1992 | Mize | 110/246 |
| 5,176,445 | 1/1993 | Mize | 366/7 |
| 5,273,355 | 12/1993 | May et al. | 366/23 |
| 5,302,179 | 4/1994 | Wagner | 71/13 |
| 5,378,059 | 1/1995 | Brock | 366/7 |
| 5,378,060 | 1/1995 | Brock et al. | 366/25 |
| 5,378,083 | 1/1995 | Swanson | 405/128 |
| 5,423,606 | 6/1995 | Milstead | 366/7 |

Primary Examiner—Henry A. Bennett
Assistant Examiner—Pamela A. O'Connor
Attorney, Agent, or Firm—Nilles & Nilles, S.C.

[57] ABSTRACT

A combined soil remediation and HMA plant is provided having a rotary dryer, a rotary soil incinerator, and a refractory lined duct connecting the incinerator to the dryer and serving as a conduit via which hot gases, forming the primary and possibly sole heat source used to heat raw aggregate in the dryer, are conveyed from the incinerator to the dryer. The duct also acts as an afterburner in which volatile organic compounds, particles of contaminated dust, and other combustible products not destroyed in the incinerator are destroyed. The plant further includes a mixer 1) receiving both reclaimed soil from the incinerator and heated and dried aggregate from the dryer and 2) mixing both materials with liquid asphalt and possibly RAP and/or dust from the system's baghouse assembly to form HMA.

20 Claims, 2 Drawing Sheets

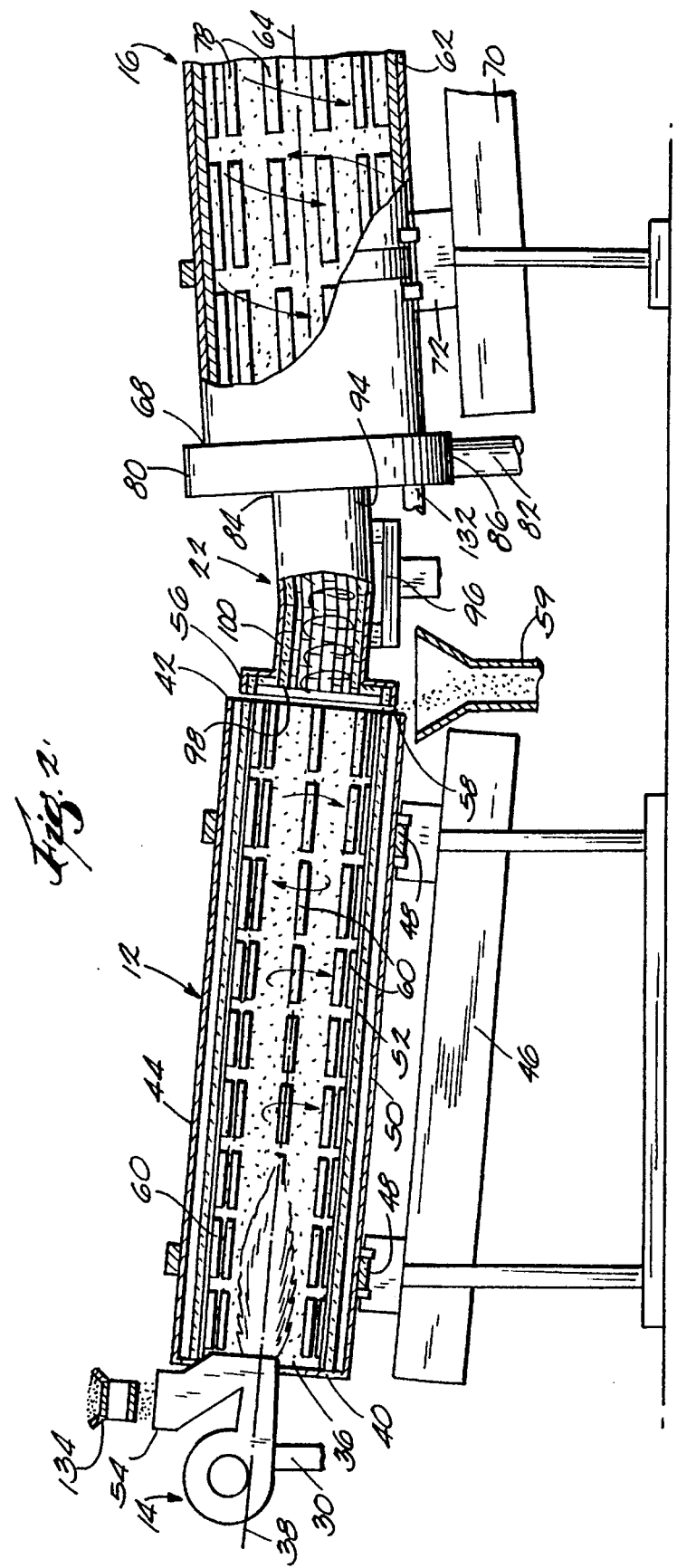

SYSTEM FOR AND METHOD OF SOIL REMEDIATION AND HOT MIX ASPHALT PRODUCTION

BACKGROUND OF THE INVENTION

1. Field of the Invention

The invention relates to an apparatus and method for remediating soil and producing hot mix asphalt (HMA) and, more particularly, relates to a combined soil remediation and HMA plant 1) having a soil incinerator and a dryer, 2) exhibiting improved soil incineration characteristics, and 3) employing a combination afterburner/gas transfer duct leading from the soil incinerator to the dryer.

2. Discussion of the Related Art

Soil remediation systems, though relatively new, are well known. The traditional soil remediation system drives volatile contaminants from soil in a primary treatment unit (typically a rotating drum-type incinerator) and incinerates a portion of the volatile contaminants therein, then conveys the remaining volatile contaminants to a separate afterburner for combustion. Destruction of the contaminants requires that the temperatures within the primary treatment unit be maintained within an appropriate temperature range (typically between 1400° F. and 2000° F.) for a sufficient time and in the presence of adequate oxygen for complete contaminant incineration. The reclaimed soils discharged from the system, being organically inert and thus not reusable for most purposes, traditionally were buried in landfills or otherwise discarded.

Soil remediation systems of the type described above exhibited marked drawbacks and disadvantages. Large quantities of heat were required both for soil remediation in the incinerator and for contaminant incineration in the afterburner. The residual heat from these processes traditionally was dissipated without being put to use and thus was wasted. Moreover, the hot incinerated soil required rather cumbersome and expensive systems to quench and moisten the reclaimed soil and to inhibit the release of dust and vapors from the primary treatment unit as well as the reclaimed soil.

Various systems have been proposed to alleviate one or more of the problems associated with traditional soil remediation systems. For instance, U.S. Pat. No. 5,129,334 to Mize (the Mize patent) discloses a system which combines a soil remediation process with a hot mix asphalt (HMA) production process. In the system disclosed in the Mize patent, the discharge end of a rotary aggregate dryer and the discharge end of a rotary soil incinerator are enclosed by a common breaching or shroud which receives both the heated and dried aggregate from the dryer and the reclaimed soil from the incinerator. A diverter gate is positioned in the breaching to permit the soil to be selectively mixed with the aggregate.

The system disclosed in the Mize patent, though satisfactory, exhibits several drawbacks and disadvantages.

First, because the rotary incinerator must be dimensioned and configured so as to fit within the common shroud, the incinerator size relative to that of the dryer is limited. In practice, the incinerator cannot have a diameter which is significantly larger than one-half the diameter of the dryer.

Second, any volatilized hydrocarbons and other contaminated products which are not incinerated in the incinerator are drawn into the dryer where there is substantial risk that they will be exhausted from the dryer without being incinerated. The Mize patent recognizes this problem and attempts to address it by providing tuyeres or apertures along the length of the rotary incinerator which supply additional air for the staged combustion of fuels and combustible contaminants in the soil. These tuyeres, however, are only partially effective and increase the complexity of the system. Moreover, providing a relatively small diameter incinerator chamber necessarily increases the velocity of gases flowing therethrough and limits the retention time of volatilized gases and contaminated dust particles in the chamber, thereby reducing further the effectiveness of the unit.

Third, it is very difficult to obtain a soil sample from Mize's arrangement because the reclaimed soil is discharged directly from the incinerator into the common shroud and mixed with heated and dried aggregate before it is available for inspection.

OBJECTS AND SUMMARY OF THE INVENTION

It is therefore an object of the invention to provide a combined soil remediation and HMA plant which recovers the excess heat from a soil remediation process by drying and heating raw aggregate in the plant.

Another object of the invention is to provide a combined soil remediation and HMA plant which has the characteristics discussed above and which includes a duct which both 1) couples the incinerator of the plant to the dryer of the plant and 2) serves as an afterburner.

Yet another object of the invention is to provide a combined soil remediation and HMA plant which has the characteristics discussed above and which controls the dust from the reclaimed soil and increases the effectiveness of the incinerator.

In accordance with a first aspect of the invention, these objects are achieved by providing a combined soil remediation and HMA plant including a soil incinerator, a burner, a dryer, and a duct connecting the incinerator to the dryer. The soil incinerator has first and second axial ends and has a contaminated soil inlet and a reclaimed soil outlet. The burner directs a flame into the first end of the soil incinerator. The aggregate dryer has first and second axial ends and has a raw aggregate inlet and a heated and dried aggregate outlet. The duct 1) extends directly from the second end of the soil incinerator to the first end of the dryer, 2) directs heated gases from the soil incinerator to the dryer, 3) acts as a heat source for the dryer, and 4) is dimensioned and configured to form an afterburner which incinerates combustible products driven from the contaminated soil in the soil incinerator but not incinerated in the soil incinerator.

Preferably, the system further includes a mixer, a first conveyor, a second conveyor, and a liquid asphalt supply conduit. The first conveyor has an inlet cooperating with the reclaimed soil outlet of the soil incinerator and an outlet emptying into the mixer. The second conveyor has an inlet cooperating with the heated and dried aggregate outlet of the dryer and an outlet emptying into the mixer. The liquid asphalt supply conduit has an outlet emptying into one of the dryer and the mixer. Preferably, the mixer comprises a pugmill having an upper inlet cooperating with the outlets of the first and second conveyors and having a lower outlet. A scavenging duct is preferably provided and has an inlet connected to the pugmill and an outlet connected to the dryer.

The duct is preferably refractory-lined to accommodate temperatures therein above 1800° F.

In order to maintain gas velocities in the incinerator at acceptably low levels, the soil incinerator preferably has a diameter which is at least 0.6 times the diameter of the dryer.

In order to function efficiently as an afterburner, the duct preferably has a diameter which is between 0.25 and 0.40 times the diameter of the soil incinerator.

Yet another object of the invention is to provide a method of remediating soil and producing HMA in the same process in a simple and effective manner.

In accordance with another aspect of the invention, this object is achieved by introducing contaminated soil into a contaminated soil inlet of a rotary soil incinerator, directing a burner flame into a first end of the soil incinerator thereby to incinerate the soil to form reclaimed soil, and discharging the reclaimed soil from the soil incinerator. Further steps include drawing hot gases from a second end of the soil incinerator and into a duct connected to the second end of the soil incinerator, drawing hot gases from the duct into a first end of a rotary dryer, feeding raw aggregate into a raw aggregate inlet of a rotary dryer, and heating and drying raw aggregate in the dryer, via heat transfer from the hot gases, thereby producing heated and dried aggregate. Still further steps include discharging the heated and dried aggregate from the dryer and incinerating, in the duct, combustible products driven from the contaminated soil in the soil incinerator but not incinerated in the soil incinerator.

Preferably, mixing is accomplished by conveying the reclaimed soil from the soil incinerator to a mixer, conveying the heated and dried virgin aggregate from the dryer to the mixer, feeding liquid asphalt into the mixer, and then mixing, in the mixer, the reclaimed soil with the heated and dried aggregate and the liquid asphalt thereby to produce HMA.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 2 is a partially cut away, side elevation view of a portion of the plant of FIG. 1.

DETAILED DESCRIPTION OF THE PREFERRED EMBODIMENT

1. Resume

Figure 1:
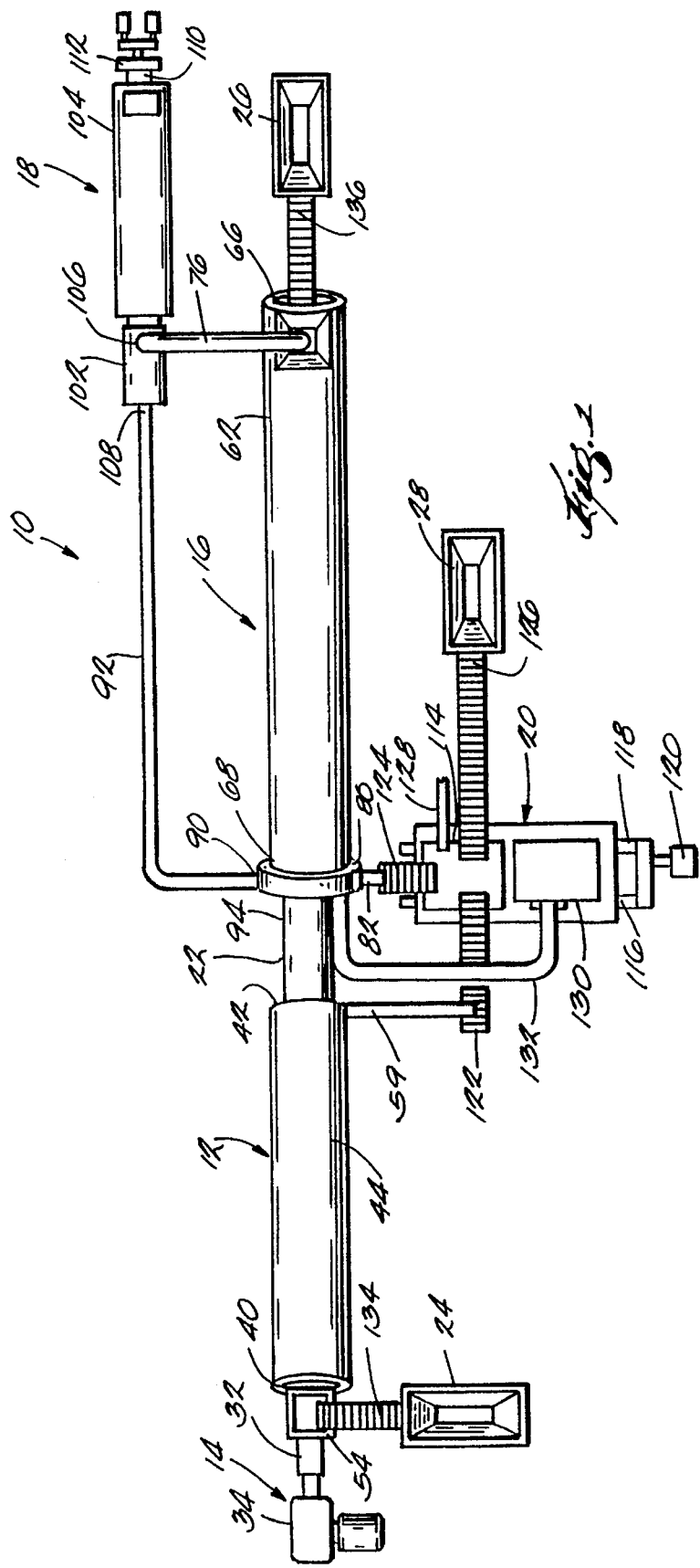
FIG. 1 is a schematic plan view of a combined soil remediation and HMA plant constructed in accordance with a preferred embodiment of the invention.

Pursuant to the invention, a combined soil remediation and HMA plant is provided having a rotary dryer, a rotary soil incinerator, and a refractory lined duct connecting the incinerator to the dryer and serving as a conduit via which hot gases, forming the primary and possibly sole heat source used to heat raw aggregate in the dryer, are conveyed from the incinerator to the dryer. The duct also acts as an afterburner in which volatile organic compounds, particles of contaminated dust, and other combustible products not destroyed in the incinerator are destroyed. The plant further includes a mixer 1) receiving both reclaimed soil from the incinerator and heated and dried aggregate from the dryer and 2) mixing both materials with liquid asphalt and possibly RAP and/or dust from the system's baghouse assembly to form HMA.

2. System Construction

Referring now especially to FIG. 1, a combined soil remediation and HMA plant 10 is illustrated for simultaneously 1) remediating soil contaminated with volatile organic compounds and/or any other contaminants removable through incineration, 2) heating and drying raw stone aggregate, and 3) mixing together the reclaimed soil, the heated and dried aggregate, liquid asphalt (liquid AC), and possibly recycled asphalt product (RAP) and/or reclaimed dust to produce HMA. The plant 10 includes a soil incinerator 12, a burner/blower unit 14, an aggregate dryer 16, a baghouse assembly 18, and a mixer 20. In addition, and pursuant to the invention, a duct 22 leads directly from the soil incinerator 12 to the aggregate dryer 16. First, second and third hoppers 24, 26, and 28 are also provided for storing contaminated soil, raw aggregate, and RAP, respectively.

The burner/blower unit 14 may comprise any device supplying sufficient heat to the system to 1) incinerate the soil and destroy the contaminants therein and to 2) dry raw aggregate in the dryer 16 and raise the temperature of the aggregate sufficiently to result in an HMA temperature of about 300° F. In the illustrated and preferred embodiment, the burner/blower unit 14 is mounted on a support frame 30 and comprises a gas burner 32 and a blower 34. The gas burner 32 is positioned at the upper end of the incinerator 12 and, in use, sprays a jet of fuel into a cylindrical combustion chamber 36 where the fuel droplets are vaporized and ignited.

Referring to FIGS. 1 and 2, the rotary incinerator 12 preferably comprises a parallel flow drum-type device which rotates about an axis 38 which is inclined with respect to the horizontal so as to convey soil from a first or upper axial end 40 thereof to a second or lower axial end 42 thereof and to tumble soil therein for maximum exposure to heat with the burner flame. More specifically, the incinerator 12 comprises a hollow drum 44 which is composed of a cylindrical wall 50 having a refractory lining 52. The drum 44 is approximately 6 feet wide and 24 feet long and is mounted on a support frame 46 by bearings 48 so as to be rotatable about the axis 38. A motor (not shown) is provided which engages an encircling gear ring (also not shown) of the drum 44 to rotate the drum about the axis. A contaminated soil inlet chute 54 is positioned adjacent the upper or first end 40 for introducing contaminated soil into the interior of the drum 44. The second or lower end of the drum 44 opens into a shroud or breaching 56. A reclaimed soil outlet 58 of the incinerator 12 is formed in the bottom of the breaching 56 and opens into a discharge pipe 59. The discharge pipe 59 in turn opens into a drag slat conveyor 122 discussed in more detail below. A plurality of flights or vanes 60 are mounted on the inside surface of the refractory lining 52 and, in use, lift the soil to cause it to cascade through the interior of the drum 44 and to move towards the lower or second end as the drum 44 rotates.

The aggregate dryer 16 may comprise any device capable of heating and drying raw stone aggregate and preferably should be one capable of being heated solely or at least primarily via hot gases flowing thereinto from the incinerator 12 and the duct 22. Towards these ends, the dryer 16 is preferably a counterflow-type rotary drum dryer which is in the form of an elongated hollow drum 62 that is approximately 9 feet wide and 45 feet long. The drum 62 presents a central axis 64 which is inclined with respect to the horizontal, thereby to define a first, upper axial end 66 located remote from the duct 22 and a second, lower axial end 68 located adjacent the duct 22.

The drum 62 is rotatably mounted on a frame 70 by bearings 72 and is driven by a motor (not shown) which engages an encircling gear ring (also not shown) to drive the drum 62 in a conventional manner. An aggregate inlet chute 74 is positioned adjacent the first or upper end 66 of the drum 62 for introducing raw stone aggregate or the like into the interior of the drum, and a plurality of outlet openings (not shown) are formed about the periphery of the drum 62 adjacent the second or lower end 68 thereof for discharging aggregate from the interior of the drum in a manner further detailed below. An exhaust gas duct communicates 76 with the upper end 66 of the drum 62 in a conventional manner and leads to the baghouse assembly 18. Finally, a plurality of flights or vanes 78 are mounted on the inside of the drum 62 for lifting the aggregate and dropping it through the interior of the drum 62 as the drum rotates, thereby causing the aggregate to cascade through the interior of the drum 62 in contact with the hot gases flowing therethrough so as to be heated and dried as it moves toward the outlet openings.

A breaching or shroud 80 encircles the outlet end of the drum 62 so as to direct hot gases into the drum 62 from the duct 22 and to direct heated and dried materials into a discharge pipe 82. The breaching preferably includes an outer axial opening 84 and a lower radial outlet 86. The outer axial opening 84 receives the duct 22 so as to permit relative rotation therebetween. The lower radial outlet 86 may open into any suitable conveyor system for transporting materials from the dryer 16 to the mixer 20. In the illustrated embodiment, this conveyor system includes the pipe 82 and a drag slat conveyer 124. A radial inlet opening 90 may be formed near the upper end of the breaching 80 for receiving dust conveyed, via an auger or screw conveyor 92, from the baghouse assembly 18 to the breaching 80. This opening permits dust to be fed into the breaching 80 and mixed with heated and dried aggregate falling into the breaching from the openings in the drum 62, thereby to remediate the dust and to facilitate its incorporation into the HMA. A device for remediating and remixing dust in a shroud or breaching in this manner is disclosed, for example, in U.S. Pat. Nos. 5,302,118 and 5,378,083 and, per se, forms no part of this invention.

The duct 22 performs several important functions. First, it serves as a conduit for the supply of hot gases from the soil incinerator 12 to the aggregate dryer 16. Second, it acts as an afterburner where at least some volatile vapors and contaminated particles which are not destroyed within the incinerator 12 are incinerated. Third, it permits the incinerator 12 to be spaced from the dryer 16, thereby providing greater flexibility in incinerator design and improved incinerator operation. Fourth, it permits a single burner/blower unit 14 to serve as at least the primary heat source for the incinerator 12 and the dryer 16. Fifth, it permits operation of the incinerator to be monitored more easily than in Mize's system. Specifically, in a system such as that disclosed in the Mize patent in which the reclaimed soil is mixed with the aggregate prior to discharge from the system, it is virtually impossible to test the reclaimed soil to determine whether or not it has been sufficiently incinerated because the soil is mixed with heated and dried aggregate before it available for inspection. Testing does not present a problem in the inventive system because samples can be obtained quite readily from the pipe 59 and/or the drag-slat conveyor 122 before the soil is mixed with aggregate. Towards these ends, the duct 22 comprises a tubular metal member 94 mounted on a support frame 96 and having an inlet 98 opening into the second or lower end 42 of the incinerator 12 and an outlet opening into the shroud 80. The duct 22 is also lined with a refractory liner 100 to accommodate temperatures on the order of 1,800° F. and higher therein. In addition, to function properly as an afterburner, the duct 22 should have a diameter which is substantially smaller than that of the incinerator 12 but which is sufficiently wide to maintain gas velocities at low enough levels to achieve sufficient gas residence times within the duct to insure incineration. Toward these ends, the duct 22 should have a diameter which is about 0.25 to 0.5 that of the incinerator 12. In the illustrated embodiment in which the incinerator 12 has a diameter of about six feet, the duct preferably has a diameter of about two feet.

As discussed above, one of the problems with the system disclosed in the Mize patent is that the incinerator must be relatively small (typically having a maximum diameter on the order of 0.5 times that of the dryer) to be capable of being received within the common breaching for the incinerator and the dryer. The relatively small diameter of the incinerator led to high gas velocities therein and reduced incineration efficiency-the gases simply did not remain in the incinerator long enough for combustion However, this problem is alleviated by the present invention. The separation of the incinerator 12 from the dryer 16 permits the use of an incinerator which is wide enough to reduce gas velocities therein sufficiently for greatly enhanced particulate and gas incineration. The incinerator 12 if necessary could be as wide or even wider than the dryer 16, and, in the illustrated embodiment, has a diameter of about 6 feet, or about 0.67 that of the 9-foot diameter dryer.

Operation of the duct 22 as an afterburner is enhanced by the restriction occurring at the interface between the incinerator 12 and the duct 22. Air flow from the relatively wide incinerator 12 into the relatively narrow duct 22 results in substantial swirling of gases and particulates as they move through the duct 22, thereby promoting mixing of the particulates and hydrocarbon gases with the relatively hot combustion products from the burner/blower 14 and promoting combustion.

The baghouse assembly 18 is conventional and includes a cyclone 102 and a baghouse 104 arranged in series with one another. An exhaust gas inlet 106, connected to the outlet of the exhaust duct 76, opens into the cyclone 102. An upper clarified air outlet 110, located adjacent the end of the baghouse 104 opposite the cyclone 102, discharges clarified gases to the atmosphere. Gases are drawn through the assembly by a blower 112 located adjacent the gas outlet end of the baghouse 104. The baghouse 104 contains a plurality of rows of bags through which the exhaust gases flow towards the outlet 110. Dust and other particles impinge on the outside of the bags and fall into a lower dust collection chamber, where they are conveyed by an internal conveyor (not shown) to a lower dust outlet 108 emptying into the auger 92.

The mixer 20 could comprise any device capable of mixing heated and dried virgin aggregate with reclaimed soil, liquid AC, and possibly RAP to form HMA. In the illustrated and preferred embodiment, the mixer 20 comprises a twin screw pugmill. The pugmill 20 has an upper inlet 114, a lower outlet (not shown), and a pair of parallel screws 116 and 118 which are driven by a common motor 120 and which mix the materials therein to form HMA. The outlet end of the first and second conveyors 122, 124 discharge into the upper inlet 114, as does the outlet of a third conveyor 126 the inlet of which receives RAP from the RAP hopper 26. Also discharging into the inlet 114 is a conventional liquid AC supply pipe or conduit 128. A scavenging system also preferably is provided for the mixer 20 and includes 1) a hood 130 for collecting volatile gases produced in the pugmill upon mixing of the various components, and 2) an insulated scavenging duct 132 having an inlet connected to the hood 130 and an outlet emptying into the shroud or breaching 80 adjacent the outlet of the duct 22.

3. Operation

In operation, contaminated soil is fed into the incinerator inlet 54 by a conveyor 134 at a rate of 20 tons per hour while raw aggregate is simultaneously fed into the dryer inlet 74 by a conveyor 136 at a rate of 450 tons per hour. The burner 32 of the burner/blower unit 14 is fired with an excess of air to heat the soil in the incinerator 12 to above 1,400° F. as the exhaust gases and soil flow concurrently through the incinerator 12 towards the second or outlet end 42, thereby incinerating contaminants in the soil and forming reclaimed soil. The reclaimed soil is discharged from the incinerator 12 and conveyed to the mixer 20 by the pipe 59 and conveyor 122. The combustion gases, still at a temperature in excess of 1,400° F. and preferably in excess of 1,800° F., flow into the duct 22 where they swirl and mix with previously uncombusted, contaminated products, thereby destroying these products.

Combustion gases flow into the second or lower end 68 of the rotating dryer 16 from the duct 22 and heat and dry raw aggregate as it cascades through the dryer 16 from the first or upper end 66. The gases then flow out of the exhaust duct 76 and into the baghouse assembly 18 for dust removal. The heated and dried virgin aggregate falls into the bottom of the shroud or breaching 80, where it is mixed with and remediates dust returned from the baghouse assembly 18 via the auger 92. The aggregate/dust mixture is then discharged into the discharge pipe 82 and conveyed away from the dryer by conveyor 124.

The reclaimed soil and heated and dried aggregate/reclaimed dust mixture are fed into the inlet 114 of the pugmill mixer 20 via the conveyors 122 and 124, respectively, where they are mixed with liquid AC injected from pipe 128 and possibly RAP supplied by conveyor 136, thereby to form HMA having a temperature of about 300° F. The mix is then discharged from the lower outlet of the mixer and conveyed to silos (not shown) for temporary storage. Volatile gases produced upon mixing the liquid AC and RAP with the reclaimed soil and heated and dried aggregate are drawn by the scavenging duct 132 out of the hood 130 and into the dryer 16 for incineration.

Many changes and modifications could be made to the invention without departing from the spirit thereof. For instance, the components need not be of the specified dimensions so long as at least some of the benefits discussed above are achieved. Moreover, dust from the baghouse assembly 18 need not be returned to the system at the illustrated location but instead could be conveyed into the discharge pipe 59 or conveyor 122 for the reclaimed soil. The scope of these and other changes will become apparent from the appended claims.

I claim:

1. A system for remediating contaminated soils and producing hot mix asphalt (HMA), said system comprising:
   (A) a soil incinerator having first and second axial ends and having a contaminated soil inlet and a reclaimed soil outlet;
   (B) a burner which directs a flame into said first end of said soil incinerator;
   (C) an aggregate dryer having first and second axial ends and having a raw aggregate inlet and a heated and dried aggregate outlet; and
   (D) a duct extending directly from said second end of said soil incinerator to said first end of said dryer, wherein said duct
      (1) directs heated gases from said soil incinerator to said dryer,
      (2) acts as a heat source for said dryer, and
      (3) is dimensioned and configured to form an afterburner which incinerates combustible products driven from said contaminated soil in said soil incinerator but not destroyed in said soil incinerator.

2. A system as defined in claim 1, wherein said contaminated soil inlet is located adjacent said first end of said soil incinerator and said reclaimed soil outlet is located adjacent said second end of said soil incinerator.

3. A system as defined in claim 1, wherein said raw aggregate inlet is located adjacent said second end of said dryer and said heated and dried aggregate outlet is located adjacent said first end of said dryer.

4. A system as defined in claim 1, further comprising
   (A) a mixer;
   (B) a first conveyor having an inlet cooperating with said reclaimed soil outlet of said soil incinerator and an outlet emptying into said mixer;
   (C) a second conveyor having an inlet cooperating with said heated and dried aggregate outlet of said dryer and an outlet emptying into said mixer; and
   (D) a liquid asphalt supply conduit having an outlet emptying into one of said dryer and said mixer.

5. A system as defined in claim 4, wherein said mixer comprises a pugmill having an upper inlet cooperating with the outlets of said first and second conveyors and having a lower outlet.

6. A system as defined in claim 5, further comprising a scavenging duct having an inlet connected to said pugmill and an outlet connected to said dryer.

7. A system as defined in claim 4, further comprising a third conveyor having an inlet connected to a source of recycled asphalt product and an outlet emptying into said mixer.

8. A system as defined in claim 1, wherein said dryer further comprises an exhaust gas outlet, and further comprising a baghouse assembly including
   (1) a contaminated gas inlet communicating with said exhaust gas outlet of said dryer,
   (2) a clarified gas outlet, and
   (3) a dust outlet connected to one of said dryer and said pugmill.

9. A system as defined in claim 1, wherein said duct is refractory-lined.

10. A system as defined in claim 1, wherein said soil incinerator has a diameter which is at least 0.6 times the diameter of said dryer.

11. A system as defined in claim 1, wherein said duct has a diameter which is between 0.25 and 0.40 times the diameter of said soil incinerator.

12. A system for remediating contaminated soils and producing hot mix asphalt (HMA), said system comprising:
   (A) a soil incinerator having
      (1) a first axial end,
      (2) a second axial end, (3) a contaminated soil inlet located adjacent said first end, and (4) a reclaimed soil outlet located adjacent said second end;

(B) a burner which directs a flame into said first end of said soil incinerator;

(C) an aggregate dryer which has a diameter of 1.3 to 1.7 times the diameter of said soil incinerator, said dryer having (1) a first axial end, (2) a second axial end, (3) a raw aggregate inlet located adjacent said second end, and (4) a heated and dried aggregate outlet located adjacent said first end; and (D) a refractory-lined duct extending from said second end of said soil incinerator to said first end of said dryer, wherein said duct (1) directs heated gases from said soil incinerator to said dryer, (2) has a diameter of between 0.25 to 0.4 times the diameter of said soil incinerator, (3) acts as the sole heat source for said dryer, and (4) is dimensioned and configured to form an afterburner which incinerates combustible products driven from said contaminated soil in said soil incinerator but not incinerated in said soil incinerator.

13. A system as defined in claim 12, further comprising (A) a pugmill mixer having an upper inlet and having a lower outlet;

(B) a first conveyor having an inlet cooperating with said reclaimed soil outlet of said soil incinerator and an outlet emptying into said inlet of said mixer;

(C) a second conveyor having an inlet cooperating with said heated and dried aggregate outlet of said dryer and an outlet emptying into said inlet of said mixer;

(D) a scavenging duct having an inlet connected to said pugmill and an outlet connected to said dryer;

(E) a liquid asphalt supply conduit having an outlet emptying into said mixer; and (F) a third conveyor having an inlet connected to a source of recycled asphalt product and an outlet emptying into said inlet of said mixer.

14. A system as defined in claim 12, wherein (1) said soil incinerator has a diameter of about 6 feet and a length of about 24 feet, (2) said dryer has a diameter of about 9 feet and a length of about 45 feet, and (3) said duct has a diameter of about 2 feet.

15. A method of remediating contaminated soils and producing hot mix asphalt (HMA), said method comprising:

(A) introducing contaminated soil into a contaminated soil inlet of a rotary soil incinerator;

(B) directing a burner flame into a first end of said soil incinerator thereby to incinerate said soil to form reclaimed soil;

(C) discharging said reclaimed soil from said soil incinerator;

(D) drawing hot gases from a second end of said soil incinerator and into a duct connected to said second end of said soil incinerator;

(E) drawing hot gases from said duct into a first end of a rotary dryer;

(F) feeding raw aggregate into a raw aggregate inlet of said dryer;

(G) heating and drying raw aggregate in said dryer, via heat transfer from said hot gases, thereby producing heated and dried aggregate;

(H) discharging said heated and dried aggregate from said dryer; and (I) incinerating, in said duct, combustible products driven from said contaminated soil in said soil incinerator but not incinerated in said soil incinerator.

16. A method as defined in claim 15, wherein the step of incinerating combustible, products in said duct comprises conveying gases through said duct at a temperature of at least 1,800° F.

17. A method as defined in claim 15, further comprising (A) conveying said reclaimed soil from said soil incinerator to a mixer;

(B) conveying said heated and dried virgin aggregate from said dryer to said mixer;

(C) feeding liquid asphalt into said mixer; and then (D) mixing, in said mixer, said reclaimed soil with said heated and dried aggregate and said liquid asphalt thereby to produce HMA.

18. A method as defined in claim 17, wherein said soil and aggregate are heated sufficiently to result in an HMA temperature of between 250° F. and 350° F.

19. A method as defined in claim 17, further comprising evacuating gases from said mixer and returning said gases to said dryer.

20. A method as defined in claim 17, further comprising (A) withdrawing dust-laden gases from said dryer;

(B) removing dust from said gases in a baghouse; and then (C) conveying said dust to one of said dryer and said mixer and subsequently mixing said dust with said reclaimed soil, heated and dried aggregate, and said liquid asphalt.

* * * * *